W. F. WHITNEY.
VEHICLE SPRING.

No. 177,307. Patented May 9, 1876.

UNITED STATES PATENT OFFICE.

WILLIAM F. WHITNEY, OF POUGHKEEPSIE, NEW YORK, ASSIGNOR OF ONE-HALF HIS RIGHT TO EDWARD STORM, OF SAME PLACE.

IMPROVEMENT IN VEHICLE-SPRINGS.

Specification forming part of Letters Patent No. 177,307, dated May 9, 1876; application filed March 21, 1876.

*To all whom it may concern:*

Be it known that I, WILLIAM F. WHITNEY, of Poughkeepsie, in the county of Dutchess and State of New York, have invented certain Improvements in Springs for Vehicles; and I do hereby declare that the following is a full, clear, and exact description of the same.

My invention relates to springs operating on the torsion principle, and is more especially designed for application to side-bar wagons.

The invention consists in a novel construction and mode of applying a torsion spring or springs to the vehicle, whereby greater efficiency, durability, and security of attachment are obtained.

In carrying out my invention, I construct two springs from a single continuous bar, by bending it into a rectangular or approximate form, and connecting its two ends to each other, or to a bracket or cross-bar or cleat. When the ends of the bar are connected to each other, the frame so formed, constituting the two springs, may be attached to the bottom of the vehicle by means of staples near the four corners; and when said ends are connected to a bracket or transverse bar, the springs may be attached to the vehicle by securing said bracket directly to the body at one end, and by using staples at the other corners. The springs are arranged parallel with each other and with the sides of the vehicle, and the parallel portions are bent downward sufficiently to allow them to operate by torsion. The springs thus constructed may be long enough to extend nearly the entire length of the vehicle, and may be fastened thereto at a suitable point or points between the ends, or two of the frames, formed as described, may be used for one vehicle. The springs are connected with the side bars of the vehicle by means of arms rigidly attached to the springs, but loosely attached to the side bars.

In some cases I employ an auxiliary torsion-bar, arranged parallel with the springs, and having its ends attached to the arms which connect the springs with the side bars. When two pairs of springs are used, the auxiliary torsion-bar serves to transfer the torsion from one spring to another, or to compensate for difference of torsion when the load in the vehicle is not evenly distributed. This auxiliary bar I call an "equalizing-bar."

The accompanying drawing illustrates the manner of carrying out my invention.

Figure 1:
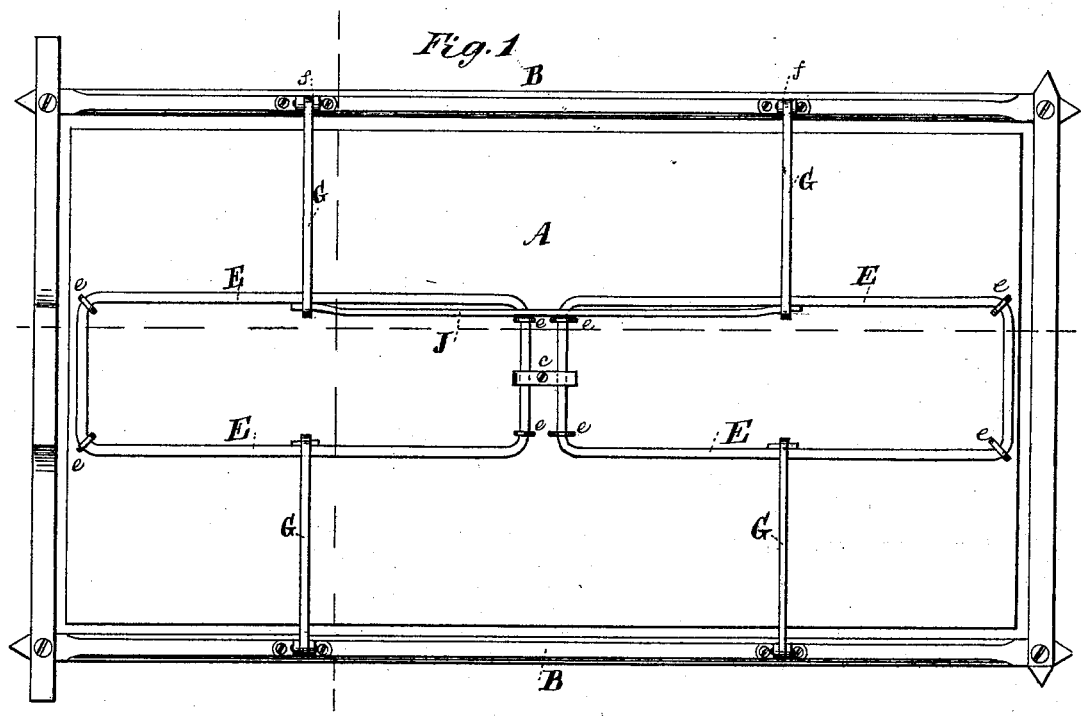
Figure 2:
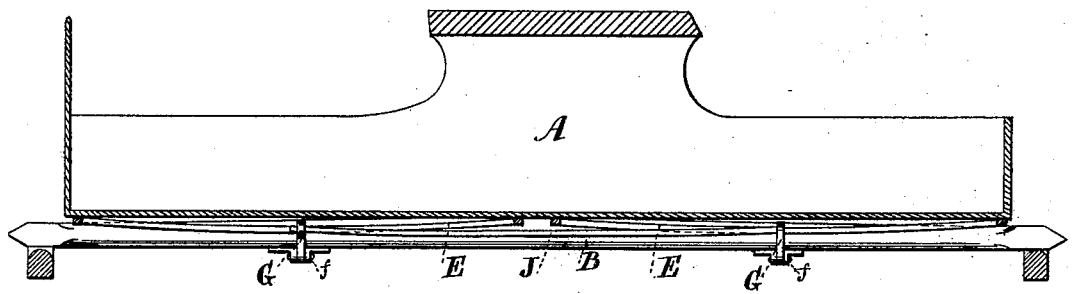
Figure 3:
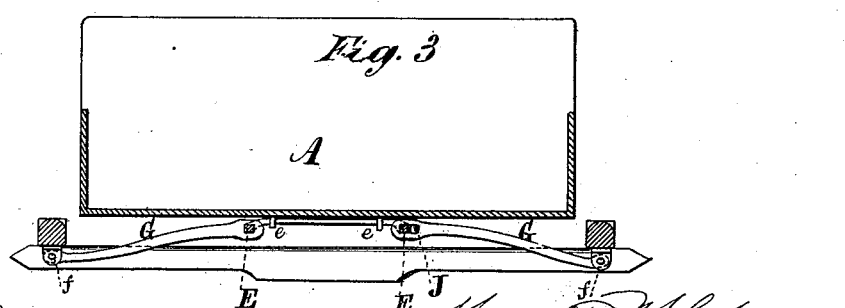

Figure 1 is a view of the under side of a wagon provided with two pairs of springs, and with one equalizing-bar shown for the purpose of illustration. Fig. 2 is a longitudinal vertical section, and Fig. 3 a transverse vertical section.

The body A and side bars B B are of the usual or any suitable construction. To the bottom of the body are attached two pairs of springs, arranged end to end. Each pair of springs consists of a frame, E E, of rectangular or approximate form, composed of a single continuous bar bent to the required shape, and having its ends joined together. Each frame so constructed is attached to the body A by staples $e$ near the corners; and the two may be still further secured by means of a bracket or cleat, $c$, applied to the contiguous ends of the two frames.

Instead of having the ends of the bar joined to each other to complete the frame, said ends may be attached to a transverse bracket or cleat, or to two brackets, which may be secured directly to the bottom of the vehicle, and staples may be used for securing the other corners.

The portion of each spring E parallel with the side bar of the vehicle is bent downward from the body sufficiently far to allow it to operate by torsion. Each spring E is connected with its corresponding side bar B by means of an arm, G, which is rigidly attached to the spring, but loosely to the side bar. As shown herein, the rigid attachment is formed by a square portion of the spring passing through a square hole at the inner end of the arm, and the loose attachment to the side bar is formed by a hinge or pivot, $f$, at the outer end of the arm. By this construction and arrangement of parts an efficient and durable torsion-spring is obtained, and its attachment to the body and connection with the side bars are effected in a secure and simple manner.

Instead of the two pairs of springs shown herein, the frame may be long enough to extend nearly the entire length of the vehicle; and each spring may be provided with a bracket or brace between its ends for connecting it to the body, and may have two or more arms connecting it with the side bars.

When two pairs of springs are used, the auxiliary springs or equalizing-bars may be employed in connection therewith, one each side of the vehicle. As represented herein, this equalizing or auxiliary spring consists of a rod or bar, J, having its ends squared and fitted into square holes in the arms G, and the intermediate portion bent sufficiently to allow it to operate by torsion. By means of this equalizing-bar the torsion is transferred from one spring to the other, or the difference in torsion is compensated for, when the load in the vehicle is not evenly distributed. The equalizing-bar may also be used in some cases when the spring extends the entire length of the vehicle, and is fastened midway of its length.

What I claim as new, and desire to secure by Letters Patent, is—

1. In combination with the parallel torsion-springs, constructed and connected as described, and the side bars B of the vehicle, the connecting-arms G, attached rigidly to the springs, and loosely to the side bars, as herein shown and set forth.

2. The auxiliary spring or equalizing-bar J, in combination with the torsion-springs E, substantially as and for the purpose herein described.

WILLIAM F. WHITNEY.

Witnesses:
HIRAM H. BRIGGS,
JAMES MULLEN,
ROBT. N. PALMER.